United States Patent [19]

Hutchings

[11] 4,152,072
[45] May 1, 1979

[54] PHOTOSENSITIVE DIODES FOR SIMPLIFIED OPTICAL HETERODYNING AND CAVITY LENGTH CONTROL

[75] Inventor: Thomas J. Hutchings, Thousand Oaks, Calif.

[73] Assignee: Litton Systems, Inc., Woodland Hills, Calif.

[21] Appl. No.: 764,760

[22] Filed: Feb. 2, 1977

[51] Int. Cl.² .......................... G01B 9/02; G01P 9/00
[52] U.S. Cl. ................................ 356/350; 250/237 G
[58] Field of Search ..................... 356/106 LR, 106 R; 250/237 G

[56] References Cited

U.S. PATENT DOCUMENTS

| | | | |
|---|---|---|---|
| 3,661,463 | 5/1972 | Brainard et al. | 356/106 R |
| 3,697,887 | 10/1972 | Lee et al. | 356/106 LR |
| 3,779,647 | 12/1973 | Dawson | 250/237 G |

OTHER PUBLICATIONS

"Ring Lasers: Prin. & App.," Smith et al.; Proc. Instn. Mech. Engrs., 1968–1969, vol. 183, Pt. 3D; pp. 38–42.

Primary Examiner—Vincent P. McGraw
Attorney, Agent, or Firm—W. Charles Porter; Harold E. Gillmann; Walter R. Thiel

[57] ABSTRACT

Three electrically isolated photosensitive diodes on a common substrate are located directly behind a multilayer dielectric coated mirror that is one of the reflective elements of a ring laser. A small percentage of the beams incident on the mirror is allowed to pass through and strike the photosensitive diodes. Two of the diodes are masked in such a way as to detect the heterodyne beat signal of two counterrotating beams in the ring laser and generate an output signal used to determine rate of rotation of the ring laser body. The third diode sums the intensity of the counterrotating beams and generates an output signal which goes to a feedback cavity length control circuit.

8 Claims, 5 Drawing Figures

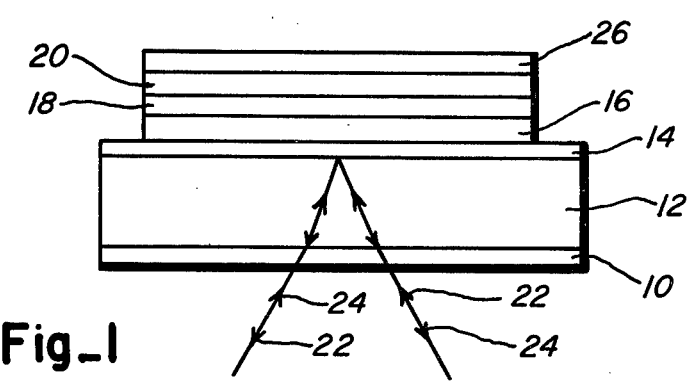
Fig_1
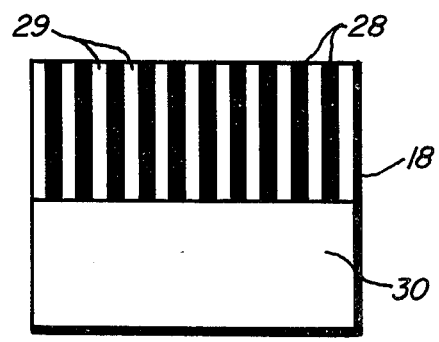
Fig_2
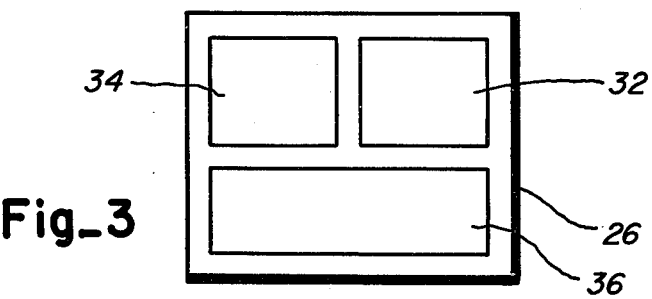
Fig_3
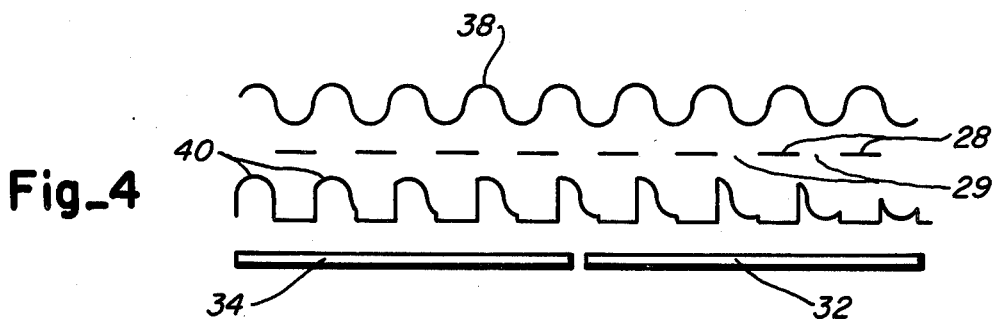
Fig_4
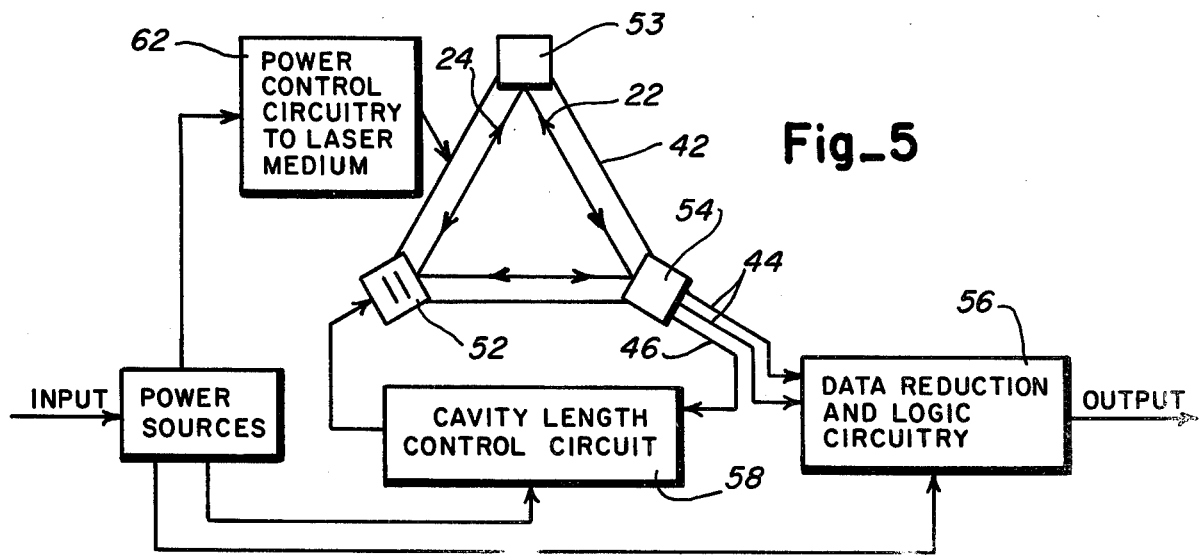
Fig_5

PHOTOSENSITIVE DIODES FOR SIMPLIFIED OPTICAL HETERODYNING AND CAVITY LENGTH CONTROL

FIELD OF THE INVENTION

This invention relates to ring laser gyroscopes employing photosensitive diodes for the optical heterodyning of counterrotating beams and cavity length control.

BACKGROUND OF THE INVENTION

Previously, readout of laser gyroscopes has been accomplished by combining a small percentage of the counterrotating beams which is allowed to pass through a dielectric coated mirror in the ring laser path. Incidentally, the term "counterrotating beams" is used herein to describe laser beams propagating in opposite directions within a ring laser cavity. Also, the terms "light waves" or "light beams" as used herein, are not limited to radiant energy waves with wave lengths only in the visible range. As a general background reference and for a detailed discussion of this combining of laser beams, attention is directed to *Laser Applications*, edited by Monte Ross, Academic Press, Inc., New York, N.Y., 1971, pp. 134 to 200 relating to "The Laser Gyro," and especially pp. 139 to 141. Briefly, this combination has been accomplished using a prism which combines the beams at slightly differing angles and thereby creates a fringe pattern across a surface containing two photosensitive diodes, each diode being much smaller than an individual fringe.

Fringe spacing is determined by the equation:

$$D = \lambda/\sin(\theta/2)$$

where D is the distance between adjacent maxima of the fringe pattern, $\lambda$ is a beam wavelength, and $\theta$ is the angle between the two beams. Typically, the fringe spacing is about 3 mm. and the two diodes are spaced about 90 degrees apart, which would be 25% of 3 mm. or about ¾ mm. When the ring laser is rotated about its input axis, the counterrotating beam frequencies change slightly, one increasing and the other decreasing. The difference in frequencies results in a beat frequency which is manifest as the rate of movement of the fringe pattern across the photosensitive diodes. The diode outputs are fed into a logic circuit which determines rate and direction of angular motion.

Laser beam intensity has been controlled by varying the cavity length. This is accomplished by oscillating one of the mirrors in the laser path with a piezoelectric element and an A-C oscillator. With the two photosensitive detectors located behind one of the mirrors and at 90 degrees to each other, as noted above, each detector principally monitors beam intensity of one of the counterrotating beams. The output signals generated in the detectors are summed and fed into a circuit which adjusts the nominal cavity length to achieve maximum beam intensity. For a thorough discussion of this type of circuit, attention is directed to NASA report No. CR-132261, "Design and Development of the AA1300Ad02 Laser Gyro," by T. J. Podgorski and D. M. Thymian, 1973, pp. 10 and 11. The chief difficulty in summing the two signals is in matching the gains of the two photodetectors employed. To make sure that the combined signal is truly made up of the correct proportions of the two photo-detector inputs, the gain of the two detectors must be matched with external electronics.

BRIEF DESCRIPTION OF THE INVENTION

In accordance with a broad aspect of the invention the two counterrotating beams of a ring laser are sampled and combined to form a fringe pattern; and an array of photosensitive areas is located in the fringe pattern. At least two photosensitive areas are arranged to monitor intensity of the fringe pattern at different phase angles. The output signals generated in these photosensitive areas are used to determine angular motion of the ring laser body.

At least one photosensitive diode averages the intensity of the fringe pattern over at least one full cycle, and preferably multiple cycles, and generates a signal representative of the sum of the two counterrotating beam intensities. This signal is directed to a standard feedback circuit used for cavity length control.

In accordance with the preferred arrangement of the invention, three isolated broad area photosensitive diodes on a common substrate are located directly behind one dielectric coated mirror of a ring laser gyroscope. A small percentage of the laser beams is permitted to pass through the mirror in the same fashion as with standard heterodyning techniques. The fringes generated by the intersection of the beams as they pass through one mirror are spaced about 75 micro inches apart for an equilateral triangular ring laser. A mask of parallel lines spaced at a slightly different spatial frequency or at different intervals from the fringes and parallel to them covers two of the photodiodes. As the fringe pattern moves, these two diodes sense the quadrature of the heterodyne beat signal. The output signals in the form of current from these two diodes go into a logic circuit which determines rate and direction of angular motion in accordance with standard techniques.

The third photodiode, which extends at least one full fringe cycle, is used for cavity length servo control. Beam intensity is varied by oscillating the cavity length with a piezoelectric element as previously described. The signal generated in the third diode is representative of the sum of the two beam intensities and is applied to a cavity length feedback control circuit. This circuit adjusts cavity length to maximize laser beam intensity.

In accordance with the invention, the mask and photosensitive diodes are mounted directly on the back of the mirror to provide a simple mechanical structure.

Objects, features, and advantages of the invention will become apparent from a consideration of the detailed description of the drawings.

BRIEF DESCRIPTION OF THE DRAWINGS

FIG. 1 is a side view of a multilayer dielectric coated mirror and detector assembly;

FIG. 2 shows the masked layer from the front, with the plane of the drawing parallel to the plane of the multilayer dielectric coated mirror;

FIG. 3 shows the orientation of the array of photosensitive diodes on their common substrate with the orientation the same as in FIG. 2;

FIG. 4 is a schematic representation of the fringe pattern developed at the mirror demonstrating how the mask allows only a portion of that pattern to fall on two of the detectors;

FIG. 5 is a schematic representative of the laser body, detector assembly, and circuitry for cavity length control and determination of angular motion.

DETAILED DESCRIPTION

FIG. 1 shows a side view of a multilayer dielectric coated mirror and photodetector assembly. On the side of the transparent substrate 12 that faces towards the rotating beams of the ring laser is an antireflection multilayer coating 10 which reduces reflection of the counterrotating beams 22 and 24 as they enter the substrate. At the back of the substrate is a multilayer dielectric coating 14 which reflects most of beams 22 and 24 back into substrate 12 and through the antireflection coating 10 to maintain the ring laser path.

A small portion of laser beams 22 and 24 is allowed to penetrate the multilayer dielectric reflective coating 14. The portions of these beams which are able to penetrate the masking layer 18 reach the array of photosensitive diodes in layer 26. Coatings 16 and 20 are standard antireflection isolators which permit polarized light to pass through one way, but not the other. These coatings prevent reflection back into the ring laser path from the mask and the photodiodes. The different coatings are drawn to show their locational relationships to each other and are not to scale. Coatings 10, 16, 18 and 20 are typically 1000 Angstroms thick, the mirror coating 14 is typically 20,000 Angstroms thick, where an Angstrom is equal to $10^{-10}$ meters.

FIGS. 2, 3, and 4 will be discussed together. FIG. 2 is a front view of the mask layer 18 separated from the front coatings 10, 12, 14, and 16. FIG. 3 shows the arrangement of the array of three isolated photosensitive diodes on a common substrate which comprises layer 26. Note that in FIG. 2 the top half of the mask layer 18 contains parallel dark lines 28 and transparent zones 29. The lines are oriented to be parallel to the fringe pattern resulting from the intersection of beams 22 and 24 at the mirror. Each dark line 28 is about the width of a dark line in the fringe pattern and acts as a light absorber to prevent light beams from passing through. The transparent zones 29 allow light to pass through and are approximately the same width as the dark lines.

The fringe spacing developed in a triangular body ring laser is about 75 micro-inches. Each dark line and each bright line in the fringe pattern developed at the mirror is therefore half of this fringe spacing. The lines 28 and 29 of the mask 18 vary only slightly in width from the fringe light and dark lines so that over the total area of the heterodyning photodiodes 32 and 34, the mask lines 28 and 29 will be uniformly spaced the same as the fringe pattern plus or minus one dark line 28.

The lower half 30 of the mask layer 18 is transparent and allows light beams to pass through substantially unaffected. The masked section of this layer 18 in FIG. 2 covers photosensitive diodes 32 and 34 of the array 26 shown in FIG. 3. The transparent portion 30 of the mask 18 covers the photodiode 36 of the array 26.

FIG. 4 is a side view schematic representative of how the fringe pattern 38 developed by beams 22 and 24 passes through the mask lines 28 and 29. The plot 38 represents light intensity versus distance of the fringe pattern as it passes through the mirror. Plot 40 represents light intensity versus distance of the fringe pattern 38 as it passes through the mask lines 28 and 29 and impinges on photodiodes 32 and 34. As shown in FIG. 4, the average light falling on photodiode 34 is greater than the average falling on photodiode 32. The signals generated in these two photodiodes are representative of the intensity of the fringe pattern 38 at two points out of phase from each other.

As the ring laser rotates in its plane, the fringe pattern will move across the mask, and the light intensities on photodiodes 32 and 34 will alternate in accordance with the resultant beat frequency generated by the two counterrotating beams. This beat frequency is representative of the angular rate of motion of the ring laser in its sensitive plane and gives rise to the output signals from each of the two photodiodes 32 and 34. The photodiodes are spaced such that their signals are 90 degrees out of phase and therefore can be used to determine rate and direction of angular motion in the ring laser's sensitive plane.

A fringe pattern falls substantially unaffected on photodiode 36 in FIG. 3. The signal generated from this diode is representative of the sum of the intensities of the two beams striking it. Since equal percentages of each of the counterrotating beams 22 and 24 are striking the photodiode 36 at the same place and time, beam intensities are really summed as they strike the surface and the output signal is truly representative of the sum of the correct proportions of the input beam intensities. When another mirror is oscillated in accordance with standard techniques in cavity length control, the output signal from the photodiode 36 is fed directly to a standard cavity length control circuit which makes adjustments in the nominal cavity length to optimize beam intensities.

FIG. 5 is a schematic representation of a laser gyroscope and the necessary circuitry to process the output signals from the array of photodiodes 26 in FIG. 3. The arrangement shown uses a triangular laser body 42 with three reflective surfaces contained in assemblies 52, 53, and 54 together with the necessary electronics and power control circuitry 62 to support two counterrotating laser beams inside a gas filled cavity in the body 42. Two counterrotating laser beams are represented by arrows 22 and 24. Assembly 54 contains the reflective surface and detector assembly shown in FIG. 1. As the laser body 42 is rotated about an axis perpendicular to the plane of the drawing, the signals in photodiodes 32 and 34 contained in assembly 54 are transmitted through leads 44 to standard logic and data reduction circuitry 56 which determines rate and direction of rotation.

Assembly 52 contains a laser reflective surface mounted to a stack of piezoelectric elements. Cavity length control is accomplished by oscillating the mirror in assembly 52 by applying an A-C voltage to the piezoelectric elements as is presently done in the art. As the mirror assembly 52 is oscillated the intensity signal in photodiode 36 of FIG. 3 varies and is transmitted through lead 46 to a standard closed loop cavity length control circuit 58 which adjusts the nominal cavity length to maximize beam intensities in the ring laser.

An important aspect of the invention as compared with the prior art involves the use of a single array of photodiodes located behind one mirror of the ring laser circuit. This array accomplishes heterodyning and provides the necessary beam intensity information for a cavity length control circuit. Such an arrangement has the advantage that the necessity of an expensive and bulky precision prism for combining the counterrotating beams is eliminated. The two separate detectors and gain adjustment electronics associated with previous cavity length control circuits are also eliminated. Further, the information necessary for heterodyning and cavity length control may be obtained with a single array of electrically isolated photodiodes on a common substrate in conjunction with a single mirror in the ring laser path.

In closing, other laser gyroscope and circuit configurations may be employed in implementing the present invention. For example, different logic circuitry may be used or the configuration of the mask and/or the photosensitive areas might vary. Also, the fringe pattern could be applied to the diode and mask assembly at another location. Laser gyroscopes using other variations, or different heterodyning or cavity length control may be within the spirit and scope of the present invention.

I claim:

1. A ring laser comprising:
   means for generating and maintaining counterrotating light beams in a closed loop optical path wherein frequency difference between said counterrotating beams is representative of the angular motion experienced by the ring laser, said closed loop optical path including reflective surfaces to restrict said light beams to said optical loop;
   partially reflective means forming part of said optical path for allowing a portion of said counterrotating light beams in said optical loop to pass through said reflective surface without significant refraction;
   means for combining said counterrotating light beams at substantially the same angle that they intersect each other at said partially reflective surface to form a fringe pattern;
   means including an array of at least two electrically isolated photosensitive areas for receiving said fringe pattern and providing output signals representative of the intensity of said fringe pattern at different predetermined angular positions;
   means for partially masking at least two of said photosensitive areas on said array; and
   means for determining angular motion connected to receive said output signals from said photosensitive areas.

2. The ring laser described in claim 1 wherein said masking means comprises parallel light absorbing lines, said lines being parallel to said fringe pattern and spaced at intervals different from said fringe pattern whereby the signals generated in said photosensitive areas are representative of intensity of the fringe pattern in at least two angular positions of differing phase relationship to each other, said output signals being used for heterodyning to determine angular motion of the ring laser.

3. The ring laser described in claim 2 wherein said array of electrically isolated photosensitive areas are located on a common substrate.

4. The ring laser described in claim 3 wherein means including an unmasked photosensitive area on said array of photosensitive areas exposed to said fringe pattern is provided for generating an output signal representative of the sum of the intensities of said counterrotating beams, whereby said output signal may be used in a cavity length control circuit.

5. A ring laser assembly as defined in claim 1 wherein said masking means and said photosensitive means are physically mounted on the back of said partially reflective surface means.

6. A ring laser comprising:
   means for generating and maintaining counterrotating light beams in a closed loop optical path wherein frequency differences between said counterrotating beams are representative of angular motion experienced by the ring laser in inertial space, said closed loop optical path including reflective surfaces to restrict said light beams to said optical loop;
   means including a partially reflective surface forming part of said optical path for allowing a small portion of said counterrotating light beams in said optical loop to pass through said reflective surface without significant refraction;
   means for combining said counterrotating light beams at substantially the same angle that they pass through said partially reflective surface to form a fringe pattern;
   an array of photosensitive areas, electrically isolated from each other, located to receive illumination from said fringe patterns;
   means for partially masking at least two of said photosensitive areas, said masking means comprising parallel light absorbing lines, said lines being parallel to said fringe pattern and uniformly spaced at slightly different intervals from said fringe pattern, to generate an output signal from each said photosensitive area representative of magnitude of said fringe pattern's intensity at a minimum of two angular positions out of phase from each other; and
   means for determining angular motion of the ring laser, connected to receive said output signals from said masked photosensitive areas.

7. A ring laser assembly as defined in claim 6 including means for optimizing the length of said optical loop including means for oscillating one of the reflective elements of said optical loop, an unmasked photosensitive area on said array of photosensitive areas positioned to receive a portion of said fringe pattern whereby a signal is generated which is representative of the sum of the intensities of said counterrotating light beams, and closed loop control circuitry to receive said output signal and adjust the length of said optical loop to optimize beam intensities.

8. A ring laser gyroscope comprising:
   means for generating and maintaining counterrotating light beams in a closed loop optical path wherein the frequency difference between said counterrotating beams is representative of the angular motion experienced by the ring laser; said closed loop optical path including reflective surfaces to restrict said light beams to said optical loop;
   partially reflective surface means forming part of said optical path for allowing a portion of said counterrotating light beams in said optical loop to pass through said reflective surface without significant refraction;
   means for combining said counterrotating light beams at substantially the same angle that they intersect at said partially reflective surface to form a fringe pattern;
   first photosensitive means sensitive to spaced zones of said fringe pattern for producing an output signal at a predetermined angular position of said fringe pattern;
   second photosensitive means sensitive to different spaced zones of said fringe pattern for producing an output signal at a different angular position from said predetermined angular position; and
   means for determining angular motion connected to receive said output signals from said photosensitive areas.

* * * * *